Nov. 29, 1960
L. LISAC
2,962,566
DEVICE FOR CHECKING THE LEVEL OF LIQUIDS
IN CONTAINERS, TANKS OR BOILERS
Filed July 8, 1958
5 Sheets-Sheet 1
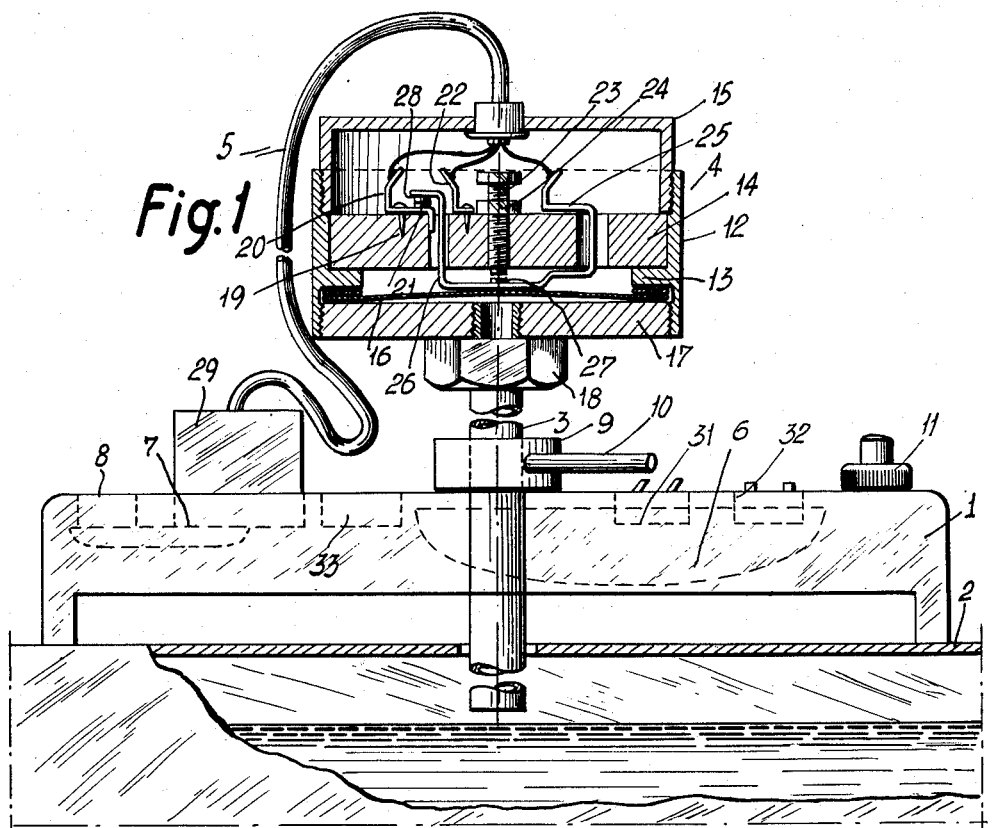
Fig.1
Fig.2
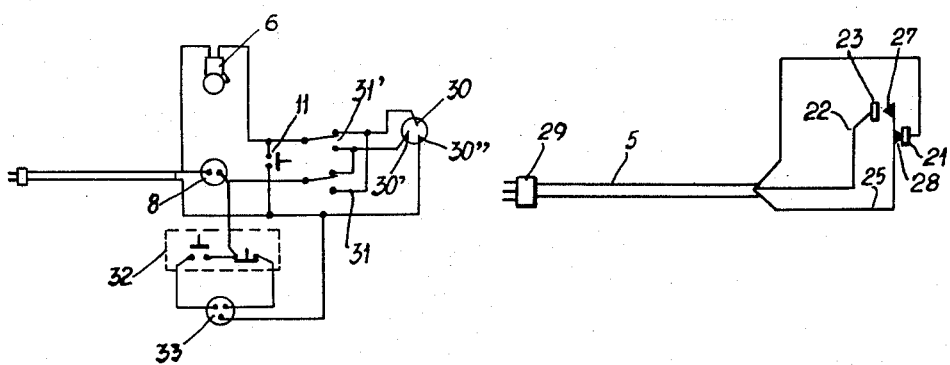
Fig.3
INVENTOR.
Leonardo Lisac
BY Michael S. Striker
Attorney Nov. 29, 1960

L. LISAC 2,962,566

DEVICE FOR CHECKING THE LEVEL OF LIQUIDS IN CONTAINERS, TANKS OR BOILERS

Filed July 8, 1958

INVENTOR.
Leonardo Lisac
BY Michael S. Striker

Nov. 29, 1960

L. LISAC 2,962,566

DEVICE FOR CHECKING THE LEVEL OF LIQUIDS
IN CONTAINERS, TANKS OR BOILERS

Filed July 8, 1958

INVENTOR.
Leonardo Lisac

BY Michael S. Striker
Attorney

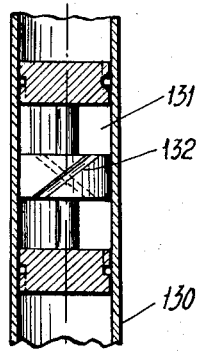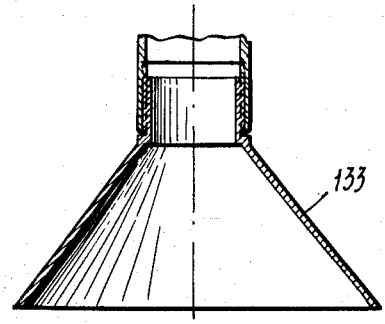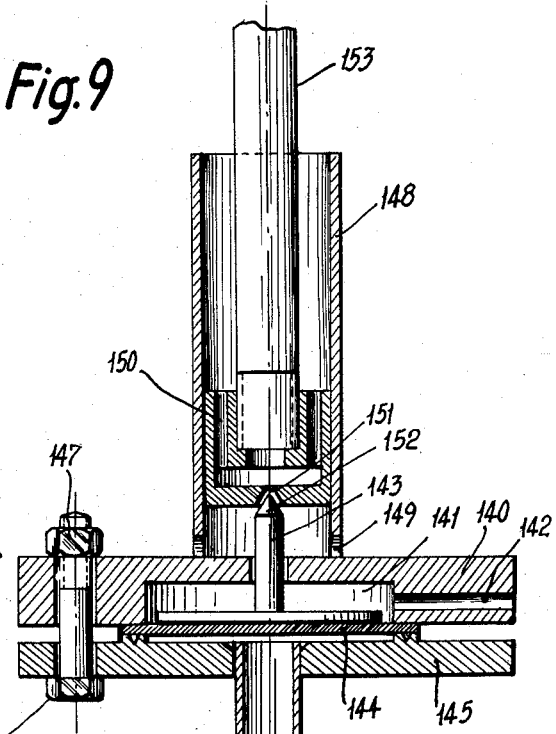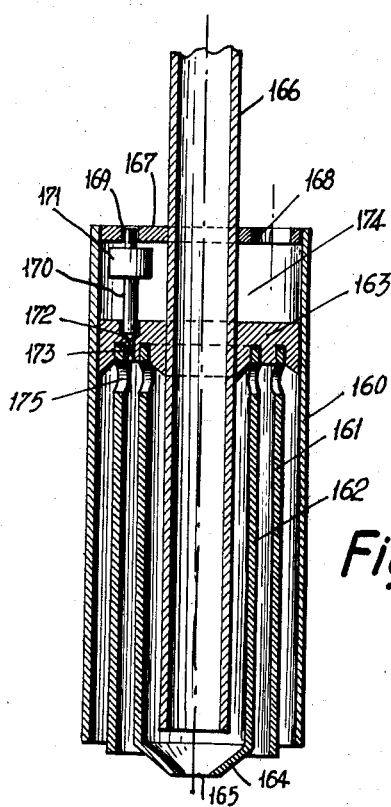
Fig. 9
Fig. 10
Fig. 11
INVENTOR.
Leonardo Lisac
BY Michael S. Striker
Attorney

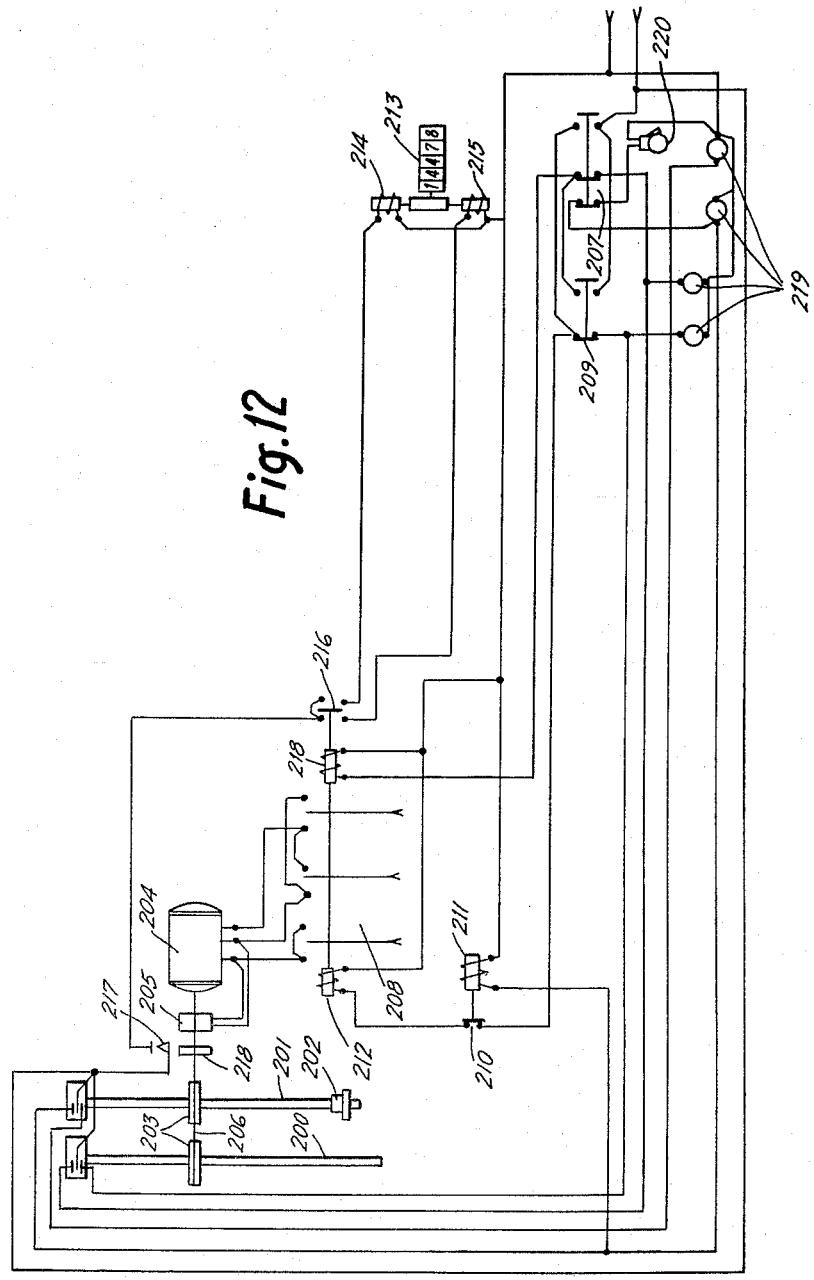

United States Patent Office 2,962,566
Patented Nov. 29, 1960

2,962,566

DEVICE FOR CHECKING THE LEVEL OF LIQUIDS IN CONTAINERS, TANKS, OR BOILERS

Leonardo Lisac, 472 Corrientes St., Mendoza, Argentina

Filed July 8, 1958, Ser. No. 747,276

10 Claims. (Cl. 200—83)

The present invention is related to a device for checking the level of liquids in containers, tanks or boilers, regardless of the pressure or temperature within the container or of the shape of the same. Furthermore, the new device may be connected to an optic or acoustic alarm system or to electrical circuits for switching on and off the operation of the pumping means.

The classic type of level meters is based on floats in operative engagement with the remaining elements of the device by means of chains, transmission bars, cables, etc. All these elements are in direct contact with the liquid, whose level is to be checked. In consequence, the corrosive effect of the liquids causes the rapid wearing off of the said elements, and the whole appliance to which the said device is attached has to be dismantled in order to replace worn out parts. Apart from the wear and tear of the movable parts due to corrosion, surface leakages of electricity have been noticed due to the condensed humidity in the insulating portions of the electric pulsators which, in this type of level meters, constitute the sole electric driving element.

A new device has now been invented in order to check the level of liquids, in which all the electric elements are situated out of reach of the liquid or of the atmosphere saturated with values of the same, and which uses as operation means of its electric circuits the changes of pressure caused by the changes of the level of the liquid within the container (tank, boiler) which it is desired to control, thus eliminating all mechanical transmission means between the level of the liquid and the electric elements of the device.

Another object of the new device consists in providing a complete unit readily connectable to any tank or container for liquids.

Yet another object of this invention consists in providing the device for checking the level of liquids with means which enable the same to operate under different circumstances, i.e. when the pressure in the container is equal to the normal atmospheric pressure as well as when the liquid is subject to excess pressure, or when it is in ebullition (as, for instance, in boilers), or when explosive gases are generated within the same, as for instance, in tanks of hydrocarbon.

The device for checking the level of liquids, object of this invention, is constituted by a sounder in the form of a tube, at whose upper end is mounted an element responsive to changes of pressure within the said tube and which is in operative engagement with the movable element of a circuit breaker.

Several additional elements, which will be described in the course of this specification, allow of the compensation of the difference of pressure of various liquids and warrant the correct functioning of the device in different physical circumstances.

For a better understanding of the device which it is desired to protect, several embodiments of the same will be described, merely by way of example, and illustrated in the appended drawings in which—

Figure 1 shows a control device for liquids under atmospheric pressure mounted on a depot, partly in vertical section, with the known portions shown in a schematic manner, so as to bring into relief of the novel parts.

Figures 2 and 3 are diagrams of the electric parts of the device.

Figure 9 is a vertical section through a sounding tube provided with means for avoiding explosions and facilitating the use of the device for thick liquids.

Figures 10 and 11 are vertical sections through additional appliances for the exact checking of the maximum, respectively minimum level of liquids, whilst Figure 12 is a diagram of an installation for the remote control of levels.

Figure 4:
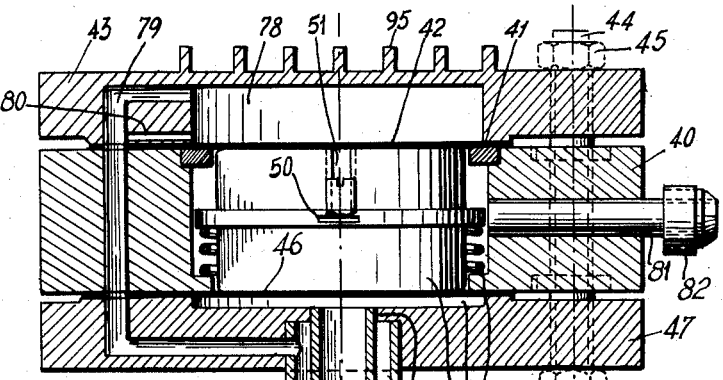
Figure 4 is a vertical section through another embodiment of the said device intended for measuring liquids under normal atmospheric pressure as well as those subject to higher pressures, but in the presence of air.

The device, shown in Figure 1, comprises a base 1 mounted on the upper portion of a depot 2 and on one side of which is fixed adjustably the sounding tube 3, provided at its upper end with a head 4, connected to the base 1 through an electric cable 5. This base 1 houses an acoustic alarm 6, a three-pole outlet 7 and a two-pole outlet 8. A clamp 9, adjustable by means of a lever 10, is mounted laterally on the upper surface of the base 1 and jams the sounding tube 3 at the desired height with respect to the said base 1. A push button 11 having normally open contacts is also fixed on the said base.

The head 4 of the tube 3 consists of a cylindrical body 12 provided with an inner circular lip 13 upon which is seated a disk 14 made of insulating material, kept in its position by the lid 15 screwed into the upper portion of the cylindrical body 12. A diaphragm 16 made of rubber or any other elastic material is placed with its perimeter against the lower side of the circular lip 13 and is kept in its place by a threaded disk 17 solidary with a nut 18. Both the disk 17 and the nut 18 are drilled through their respective centers and receive in their perforations the upper end of the tube 3, a direct communication being thus established between the lower side of the diaphragm 16 and the interior of the sounding tube 3.

The disk 14 is made of insulating material, and secured to the same by means of screws 19 are three sheets: the first 20 provided with a back contact 21, the second 22 connected to an adjustable contact screw 23 blocked by the nut 24, and the third sheet 25, which has a flexible bend 26, carrying a contact 27 facing the end of the screw 23. The free end of the said bend 26 is provided with a second contact 28 which rests on the back contact 21 or the sheet 20.

The tongues of the sheets 20, 22 and 25 are welded to the ends of the conductors forming the cable 5, which ends in a three-pin plug 29 adjustable to the three-pole outlet 7, whose contacts 30, 30', 30'' correspond to the sheets 22, 20 and 25.

The base 1 houses furthermore two single-pole throw-over switches 31, 31', a double push button 32 and an additional three-pole outlet 33 for connecting to the coil of a circuit-breaker.

When the level of the liquid within the container 2 does not reach the lower end of the sounder, there is no pressure in the tube 3, the contacts 21 and 28 are closed, and a circuit of continuity is being kept which feeds the two terminals of the plug 8 connected to the three-pole outlet 7. A loading pump may be connected to the plug 8 if a constant level is to be kept, or to the three-pole outlet 33, if the level is only to be checked at a distance.

The rising of the liquid within the container 2 generates a pressure of air within the sounder 3 when it reaches the lower end of the same and deforms the diaphragm 16 which presses the yieldable bend 26 of the sheet 25. Consequently, the free end of the said sheet with its contact 28 is withdrawn from the back contact 21, interrupting the feeding of the outlet 8, while the contacts 27 and 23, on the contrary, are closed, thus establishing the alarm circuit which leads to the acoustic alarm 6 or any other type of alarm or a combined alarm. This alarm announces that the liquid has reached the preestablished level.

If it is desired to check whether the device is in normal operative conditions, it is sufficient to press the push button 11 in order to close the feeding circuit of the alarm 6 in such a manner that the functioning of the same will show that electric current is correctly fed to the device.

The described device works only under atmospheric pressure and when there is air in the container. If, however, it is desired to work under different conditions, then the device must be modified so as to equilibrate the existing pressure.

Figure 5:
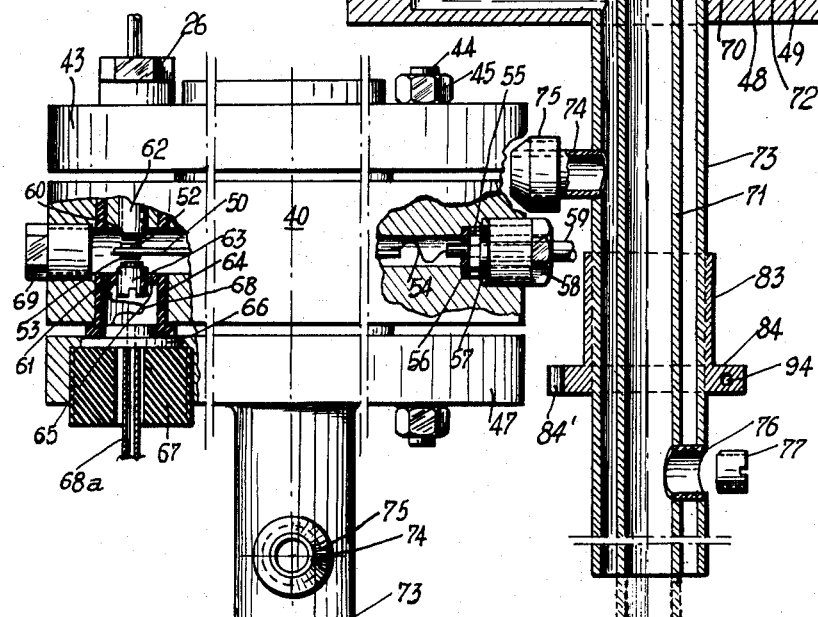
Figure 5 shows the same device turned 90° with respect to the illustration in Figure 4.
Figure 6:
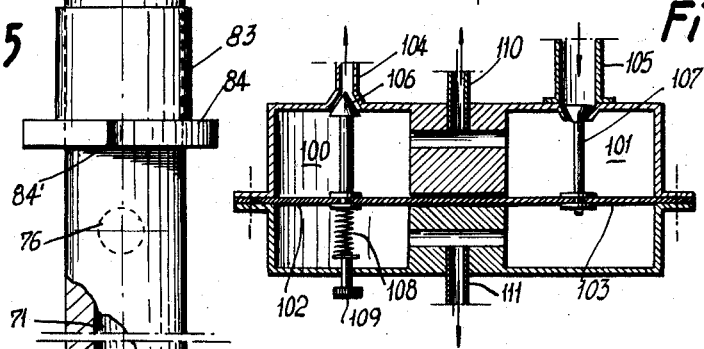
Figure 6 is a vertical section through an apparatus which is added to the device shown in Figures 4 and 5, in order to allow of its use for very high pressures.

An embodiment which may be used both for atmospheric and higher pressure is shown in Figures 5 and 6.

The device consists of a hollow cylindrical body 40 whose upper inner edge is cut down and into which fits a ring 41, whose inner diameter is smaller than the inner diameter of the cylindrical body 40. A diaphragm 42 is seated upon the said ring 41 and is pressed against the same by means of a lid 43, secured to the hollow cylindrical body 40 by means of bolts 44 and nuts 45. Against the lower base of the same cylindrical body 40 another diaphragm 46 is placed, pressed against the same by means of a lid 47, fixed to the cylindrical body with the aid of the said bolts 44. In the chamber constituted by the two diaphragms 42, 46 a piston 48 is housed. This piston 48 is supported by a spring 49 in such a manner that its weight is perfectly balanced. The sides of the same are in alignment with the inner surface of the cylindrical body 40. In the middle of the said piston 48 a sheet 50 is housed and its correct position is secured by a screw 51. This sheet 50 carries at one end a double contact 52, 53. The opposite end of this sheet 50 is connected to a flexible electric conductor 54, whose other end is welded to the element 55 fixed in the hollow cylindrical body 40, but insulated from the same by the washers 56 and 57 and tightened by the screwed plug 58. The outer end of the element 55 is connected to an insulated electric conductor 59 which runs through the plug 58. The double contact 52, 53 is opposed to the contacts 60 and 61, welded to the tips of the repective screws 62 and 63 which pierce the cylindrical body 40 in opposed directions, their respective longitudinal axes forming an imaginary straight line. If the body 40 is not made of an insulating material, the passages are formed by insulating bushings 64, closed at one end by a metallic washer 65, through which runs the screw 63, whilst the other end is closed by a metallic plug 66 held tightly by an insulating nut 67. The metallic washer 65 and the plug 66 are connected by a flexible wire 68. An insulated wire 68a is welded to the other face of the plug 66.

The other screw comprises the same elements and is mounted in the same manner. The space in which are housed the contacts 52, 60 and 61 may be reached through a horizontal perforation made in the cylindrical body 40, which, however, is hermetically closed by means of a threaded stopper 69.

The lower lid 47 of the device is provided with a central opening having an inner annular projection 70 on its upper edge. Into the said projection fits the sounder 71, thus connecting the chamber 72, formed by the lower lid 47 and the lower diaphragm 46, with the interior of the container on which is mounted the device. A tube 73, having a larger diameter than the sounding tube 71 and concentric with the latter, is secured at the widest portion of the perforation made in the lid 47 so as to avoid communication with the chamber 72.

The outer tube 73 is provided with a branch 74 which may be closed by a stopper or ends in a coupling 75, and the inner tube 71 is provided, preferably at a point lower than that of the branch 74, with a passage 76, which may be closed by means of a stopper 77. This passage 76 is hermetically separated from the space defined by the two concentric tubes 71, 73.

The chamber 78, formed by the upper diaphragm 42 and the lid 43, communicates with the outer tube 73 by means of a conduit 79 drilled in the upper lid 43, the hollow cylindrical body 40 and the lower lid 47. This conduit leads to the upper portion of the said chamber 78. To the lower portion of the same chamber 78 leads another conduit 80, parallel to the first conduit 79 and which ends at the vertical portion of conduit 79. The space in which is housed the piston 48 communicates with the exterior through a small pipe 81 which ends in a closable coupling 82.

In order to use the device for checking the level in containers which are in contact with the atmosphere, it is necessary to close hermetically the passage 76 with the threaded stopper 77, leaving the branch 74 of the outer tube 73 open. When the liquid reaches the lower end of the inner tube 71, it causes a compression of air in the same, pushing upwardly the diaphragm 46, which in turn displaces upwards the piston 48, thus opening the contacts 53 and 61, but closing the contacts 52 and 60. These circuits operate the electric alarm and pumping devices in the manner described in connection with the embodiment shown in Figure 1. When the level of the liquid drops, the piston 48 descends and the upper pair of contacts 52, 60 is opened, whilst the lower pair 53, 61 is closed and the electric device works contrariwise with regard to the foregoing description.

Figure 7:
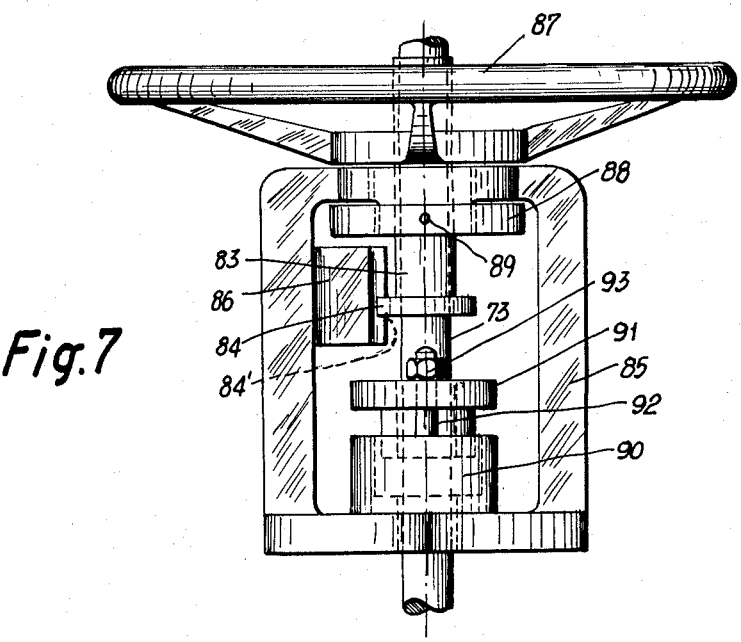
Figure 7 shows an auxiliary device for mounting the device shown in Figures 4 and 5 on to containers, in which the pressure is higher than the atmospheric pressure and which allows of the adjustment of the height of the device for checking the level, without dismantling the same.

In order to apply the level checking device to containers in which the pressure is higher than the pressure of the atmosphere, but which operate in the presence of air, the outer tube 73 is provided with an outwardly threaded sheath 83, provided with a guide disk 84 and a groove 84' in order to secure the device on the container 2 by means of the auxiliary apparatus shown in Figure 7.

The latter apparatus allows of modifications as to the height of the level checking device without the necessity of dismantling the same from the container. It consists of a casing 85 provided with a guide 86 and a flywheel 87 on to whose extension is screwed a catch 88. The correct position of the said catch 88 is achieved by means of a pin 89. On the opposite side of the casing 85 there is a stuffing box 90 with a counter piece 91 secured to the body 90 by means of two bolts 92 with their respective nuts 93.

In order to secure the device for checking the level of liquids, the threaded sheath 83 is screwed to the extension of the flywheel 87 after being passed through an opening in the casing 85 in a position in which groove 84' is engaged by the axially extending guide bar 86. The catch 88 is placed between the two elements 85 and 84.

Then the catch 88 is screwed on to the flywheel 87 and fixed in its correct position by means of the pin 89, and the sounding tube 73 is introduced into the sheath 83 and after passing through the counterpiece 91, the tube 73 is put through the perforation of the casing 85. In the free space between the tube 73 and the stuffing box body 90 a stuffing box made of a suitable material is placed. This stuffing box is compressed by means of the element 91 by tightening the nuts 93 upon the bolts 92. A hermetic closure will thus be obtained which will permit the lineal displacing of the sounder 73 by turning the flywheel 87. The casing 85 is fixed upon the container (depot, tank) by means of a flange which will be in hermetic engagement with another flange provided on the said container. The sheath 83 is fixed onto the tube 73 by means of a screw 94 closing the section of the said sheath 83 and compressing the tube 73.

When the device for checking the level is thus mounted upon the container, then, apart from closing the perforation 76 of the inner tube 71, the branch 74 of the outer tube 73 is closed by means of a blind nut 75. Therefore, the pressure within the container will not displace the piston 48, inasmuch as the same pressure is applied to both diaphragms 42, 46, reaching them in converging directions, the upper diaphragm 42 by means of the outer tube 73, the conduit 79 and the chamber 78, and the lower diaphragm 46 through the inner tube 71 and the chamber 72. When the liquid reaches the lower edges of the tubes 71 and 73, a pressure is originated therein, which grows more rapidly in the inner tube 71 than in the outer tube 73, due to the fact that the volume of the lower chamber 72 is smaller than that of the upper chamber 78 which communicates through the conduit 79 with the outer tube 73. Therefore, the piston 48 will be displaced in upward direction operating the electric elements in the aforementioned manner. The auxiliary conduit 80 which starts from the lower portion of the expansion chamber 78 serves for returning the condensed vapours to the outer tube 73, so as to prevent them from changing the operative characteristics of the device.

When the level checking device is applied to boilers and other containers with heated liquids which operate without the presence of air, then the device will work in the following manner: The vapours entering the outer tube 73 will start cooling off in the same and upon rising higher the process of cooling off will be increased when they enter in contact with the lid 43, more so as the same may be provided with lugs 95 for increasing the surface of radiation. When the liquid reaches the lower ends of the tubes 71 and 73, the intensified process of cooling off in the outer tube 73 causes a depression in the same, which corresponds to the difference of temperature between the vapours in the outer tube 73 and those in the inner tube 71. This phenomenon may be intensified by feeding to the outer tube 73 a liquid whose temperature is lower than the temperature within the container. The liquid is fed through the branch 74. However, this auxiliary feeding must be kept under control in order to avoid dynamic drops of pressure in the outer tube 73 which could interfere with the correct working of the level checking device. The perforation 76 of the inner tube 71 may be left open. It is to be understood that the difference of pressures in the two tubes causes the upward displacement of the piston 48 and the activity of the electric elements as described hereintofore.

When the device is used for checking levels of liquids whose temperature is lower than the temperature of the atmosphere, the operation going on without the presence of air, or when the temperatures are so high that the liquid could damage the diaphragms, the same is introduced contrariwise, that is, the head comes down and the tubes point upwards. In this case, the inner tube 71 must be longer than the outer tube 73, as shown in Figures 5 and 6 with broken lines. With a high level of liquid both tubes 71, 73 shall be covered so that the pressures to which are subject the diaphragms 42, 46 shall be equal. If the level begins to drop, the end of the inner tube 71 will jut out of the liquid, and the pressure upon the diaphragms 42, which communicates with the outer tube 73, will be lower than the pressure upon the diaphragm 46, which will be constant. In this case, the branch 74 as well as the passage 76 must be hermetically closed.

When the pressures are exceedingly high and in order to avoid the use of very thick diaphragms which in practice would be nearly insensible, an auxiliary appliance may be used as shown in Figure 6. This appliance consists of a casing provided with two chambers 100, 101, which communicate with each other through two parallel ducts. A diaphragm 102, 103 divides each chamber into two compartments. Each compartments has a connecting pipe 104, 105, one of them closed by an exhaust valve 106, the other one by an inlet valve 107, whose rods are connected to their respective diaphragm 102, 103. A spring 108, adjustable by means of a screw, presses against the rod of the exhaust valve 106. The ducts connecting the two chambers 100, 101 are provided with respective branch pipes 110, 111.

The upper portions of the said chambers 100, 101 are connected with the space in which moves the piston 48 by means of the pipe 110 which is connected to the pipe 81 of the level checking device. The pipe 105 which is closed by an inlet valve 107 is connected with a source of compressed air, whilst the pipe 111, which leads to the lower portion of the two chambers 100, 101, connects them with the interior of the container. The compressed air must have a pressure somewhat higher than that reigning within the container. When the pressure within the controlled container is higher than that of the space where the piston 48 moves, compressed vapours will enter through the pipe 111 and deform the diaphragm 102, closing the exhaust valve 106, and opening at the same time the inlet valve 107. Compressed air will enter through the pipe 105 and when the pressures become equal, the diaphragms 102, 103 will return to their normal position, closing the inlet valve 107. When the pressure in the space in which is housed the piston 48 exceeds that in the container, the diaphragms 102, 103 will work contrariwise, opening the exhaust valve 106, but keeping closed the inlet valve 107, until the pressures are balanced. In order to avoid the continuous play of the valves 106, 107, the exhaust valve 106 will be subject to the pressure of the spring 108, adjustable by means of the screw 109, so that both valves will operate with somewhat different pressures, excluding the possibility of both valves being open at the same time.

Figure 8:
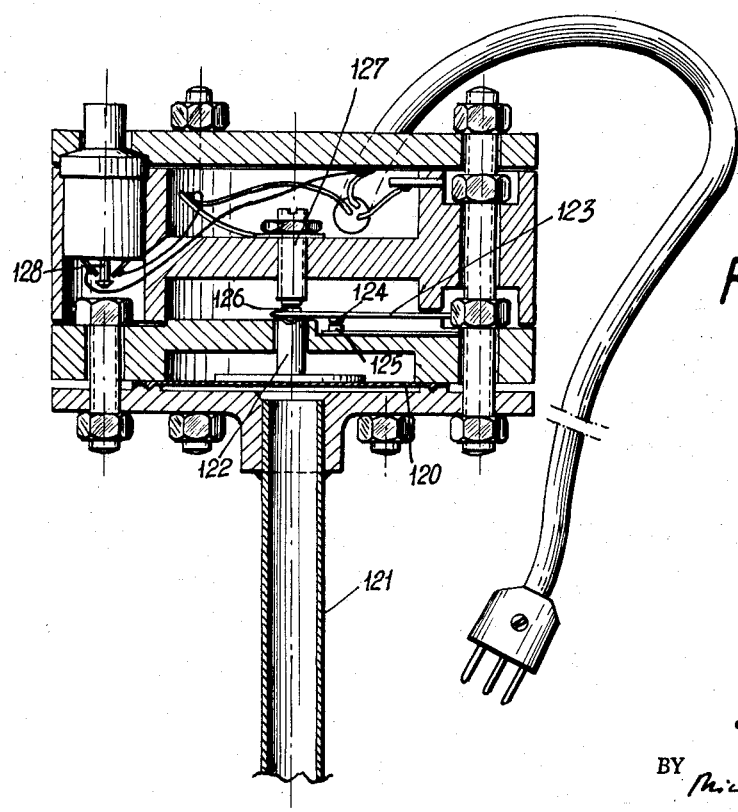
Figure 8 is a modified device (in vertical section) in which the pressure is transmitted through a piston, in order to increase the force acting on the contact, to give a better electric insulation and to act as a safety device against explosions.

Another embodiment of the device for checking the level of liquids is shown in Figure 8, which is a modification of the device illustrated in Figure 1. The diaphragm 120 communicating with the sounder 121 transmits the received impulse to a piston 122, comprising two portions, the lower and broader part is seated upon the diaphragm 120 and the narrow upper portion presses against a contact sheet 123, the said narrow portion jutting through a perforation made in the body of the device. This sheet 123 is provided with two contacts: one of them 124 on its lower surface facing a fixed contact 125, on which it rests when the pressure in the sounder 121 is low, and the other one 126 on its upper surface, facing a contact screw 127, which is closed when the pressure rises and the piston 122 pushes upwards the sheet 123. This embodiment separates effectively the contact chamber from the chamber housing the diaphragm. A push button 128 is embedded in the body of the relay, connected in parallel to the contacts, and which serves as a control means. The electric part of this embodiment is the same as the one described hereintofore.

Although the piston 122 efficiently separates the chamber of contacts from the chamber where the diaphragm is housed and prevents explosions, it is possible to increase the security of the device, particularly when the same is used in the oil industry by providing the sounder 130 (corresponding to the tubes 3, 71, 73 or 121 of the previously described embodiments) with a labyrinth 131, the chambers of which can communicate by means of a single or double spiral shaped canal 132 as shown in Fig. 9. Should an explosion occur in the head of the device, the hot gases would not spread directly to the container (tank), but would expand within the labyrinth 121 and cool off before entering into the sounder 130.

Furthermore, a cone-shaped extension or funnel 133 may be screwed upon the lower end of the sounder 130. This funnel 133 is particularly important when thick liquids are checked, which could clog the inlet of the tube 130 and falsify the measurements. The funnel allows of the easy loosening of such matter and, moreover, the sudden narrowing causes a rapid compression of air which prevents the entry of liquids into the sounder 130.

The above described device is susceptible of other modifications in order to be suited for different purposes without exceeding the spirit and scope of the invention. Thus, for instance, it is possible to combine into a double apparatus the checking of the maximum and minimum level, using for the former a short sounder and for the latter a longer sounding tube. In this case, the apparatus comprises two complete devices, incased in one head, whose electric parts work independently. The difference in the length of the two sounders depends on the levels which it is desired to check.

The described embodiment suffices for normal checking, but when very precise readings of maximum levels are needed, even small changes of temperature are sufficient to change the result. It has been noted that the rising velocity of levels influences the work of the device, so that an additional appliance has been invented which subjects the checking device to very sudden high pressures at a predetermined level.

This appliance, illustrated in Figure 10, consists of a disk 140, with a centrally located cavity 141, which communicates with the outside by means of a lateral conduit 142. The center of the disk 140 is perforated and through the same juts a piston 143, whose lower and broader part remains in the cavity 141, seated on a diaphragm 144, which is pressed against the rim of the disk 140 by another disk 145. The two disks 140, 145 are held together by bolts 146 tightened by nuts 147.

A tube 148 is fixed upright on the upper surface by disk 140, this tube being provided with openings 149 adjacent its lower end. The tube 148 houses a perforated member 150 in the space over the openings 149. This member has a centrally located opening or valve 151, which can be closed by the jutting end 152 of the piston 143. The lower end of the sounder 153 (which corresponds to tubes 3, 71 or 121) is screwed into the said member 150. The lower disk 145 carries another sounding tube 154, whose interior communicates with the chamber beneath the diaphragm 144.

When the level of the liquid rises and submerges the lower end of the sounder 154, a pressure is generated inside the same which deforms the diaphragm 144 and the piston 143 closes the valve 151. The liquid cannot enter the tube 148 before reaching its upper rim. At that precise moment the liquid overflows into the tube 148 and generates a sudden pressure in the sounder 153, which sets in motion the device. When the level falls beneath the lower end of the sounder 154, the pressure inside the same disappears, the valve 151 is opened and the liquid contained in the tube 148 is drained through the valve 151 and the openings 149. The liquid which could remain upon the diaphragm 144 returns to the container by means of conduit 142.

A device fitted with the described appliance can check also two levels, the maximum and the minimum, but in this case the back contact, which will be opened when the liquid overflows into tube 148, must cut off the current of the pumping means. This back contact will be closed when the level falls to the lower end of the sounder 154 and the pumping means will be once more in circuit.

For the exact checking of the minimum level, an additional appliance, illustrated in Figure 11, can be affixed at the lower end of the sounder. This appliance consists of three concentric tubes 160, 161, 162, whose upper ends are united by a ring 163, but whose lengths are different. The inner tube 162 ends in a conical cap 164, provided with a small central opening 165. The sounder 166 of the level checking device (corresponding to tubes 3, 71, 121 or 154) enters the appliance through the central opening of the ring 163. The fitting of this sounder 166 is water-tight. The outer tube 160 protrudes above the two inner tubes 161, 162, and a second ring 167 joins its upper end with the sounder 166. This upper ring 167 has various openings 168 and one smaller perforation 169 which guides the pin 170 of a floater 171. This pin 170 closes the valve 172 made in the lower ring 163, which valve communicates by means of a perforation 173 the upper chamber 174 with the space between the outer tube 160 and the lower part of the sounder 166. The two inner concentric tubes 161, 162 are provided, at a point adjacent the ring 163 with a plurality of openings 175.

When the level of the liquid rises, the air contained in tubes 160, 161, 162 will leave through the valve 172 which will be lifted from its seat by the floater 171. Inside the sounder 166 a pressure will be generated, which will open the back contact and close the working contact. When the level of the liquid begins to fall, the valve 172 will remain closed with part of the floater 171 submerged in liquid. The liquid remaining in chamber 174 will seal off hermetically the rest. Notwithstanding the further fall of the level, the space limited by concentric tubes 160, 161, 162 will remain full, whilst the pressure inside the sounder 166 will decrease until the working contact is opened and the back contact closed. The change of contacts can be used as a forewarning that the liquid is nearing its preestablished minimum level. When the liquid clears the lower rim of the outer tube 160, which is shorter than the other two tubes, the water column is broken and the whole quantity of liquid contained between tubes 160 and 161 and between tubes 161 and 162 is drained into the container. The liquid contained between the sounder 166 and the inner tube 162 will drain off slowly owing to the small diameter of the opening 165. This will cause a transitory pressure in the sounder 166 which can be used for sounding an alarm or for starting the pumping means.

As has been mentioned before, all the above described embodiments serve not only to sound the alarm, but are susceptible of being connected with pumping means governing their switching on and off. The manner in which they are connected to the present device is sufficiently known in the art as to make a description thereof redundant.

Nevertheless a possible application of the present invention to a remote level control installation will be described hereintofore. The diagram of Figure 12 shows two level checking devices 200, 201, such as illustrated in Figures 1, 4 and 8, one of them with a longer sounder, 200, and the other one, 201, with a shorter sounder provided with a maximum measuring appliance 202, as illustrated in Figure 10. The devices are mounted by means of the apparatus illustrated in Figure 7, but the manually operated wheel 87 is substituted by a gear 203 moved by a worm milled on the shaft of a motor 204. In order to offset the influence of the inert masses of the system the motor has an electric brake 205 acting on the shaft 206 and which starts when the motor is under-tension, The working contact of the device 200 without the accessory 202 is connected through the back contact of the push button 207 with the commanding coil of the switch 208. When these contacts are closed the switch starts the motor 204 and the whole system ascends until the pressure in the sounder 200 is increased and opening the contacts switches off the motor. The contacts are adjusted so that when there is no pressure the back contact is closed, when there is a low pressure the contact is opened and when the pressure mounts the working contact is closed. The other contact of the same device is connected through the push button 209 and through the back contact 210 of the auxiliary contactor 211 with the coil 212 of the switch 208. When this contact is closed the switch reverses the phases and the motor 204 rotating contrariwise lowers the whole system until the increase of pressure has opened this contact. Thus the whole system follows the fluctuations of the level, but the device 201 provided with the appliance for measuring the maximum level 202 does not come in touch with the liquid due to its shorter sounder.

The position of the system can be read on the counter 213 moved by two magnetic coils 214, 215. These coils are alternately connected through the switch 216, coupled to the contactor 208 of the motor, with a pulsating contact 217, operated by a cam 218 mounted on the shaft 206 of the motor. When the electric impulses given by the pulsating contact 217 are received by the coil 215, the counter 212 will recede whilst the impulses received by the coil 214 will make it advance. Each turn of the shaft 206 corresponds to a certain unit of measurement. The brake 205 always stops the shaft 206 in the same position.

The readings thus given by the counter 213 will necessarily suffer from a certain degree of inaccuracy due to changes of the temperature, the speed of the fluctuations, the resistance of the diaphragm, etc.

But if an exact reading is required, the push button 207 has to be pressed and the connection between the working contact and the coil 218 is cut off and coil 212 is switched on to the network. The whole system begins to descend until the sudden pressure in the shorter sounder 201 closes the working contact of this device giving tension to the auxiliary contactor 211 which opens the contact 210 and cutting off the coil 212, stops the system lighting the respective signal lamp 219. The acoustic alarm 220 is connected to the other contact of the push button 207 in order to avoid its functioning when precision readings are made.

The push button 209 allows the raising of the system out of the liquid so as to renew the air in the longer sounder 200, whose tip is usually submerged.

What I claim is:

1. A device for checking the level of a liquid in a container and comprising in combination, a pair of concentric sounder tubes defining an inner space and an outer space; a head member mounted at one end of said tubes and being formed with a cavity and communicating at one side thereof with said inner space, and being also formed with a conduit connecting said outer space with the other side of said cavity; diaphragm means including a pair of parallel diaphragms movably mounted on said head member and extending transversely through said cavity, and a piston secured to said diaphragms and extending between the same for movement with the same, one of said diaphragms defining in said cavity a first chamber of smaller volume communicating with said inner space, and the other diaphragm defining in said cavity a second chamber of greater volume communicating with said conduit whereby a pressure differential acts on said diaphragm means when gaseous matter under pressure enters said inner and outer spaces and said first and second chambers, said diaphragms defining between each other a third chamber, and a spring means in said third chamber abutting against said head member and said piston for counterbalancing the weight of said piston; and switch means located in said third chamber and including a movable part connected to and controlled by said diaphragm means and at least one stationary part secured to said head member, said switch means being adapted to be connected to an alarm system and to a control system for pumping mean sassociated with the container.

2. A device as set forth in claim 1 wherein said head member has an opening connecting the outside thereof with said third chamber, and plug means for normally closing said opening; and wherein said head member includes a middle part and two cover plates, said diaphragms being mounted, respectively between one of said cover plates and said middle part; and means for securing said cover plates to said middle part and diaphragms in a fluid-tight manner.

3. A device as set forth in claim 1 wherein each of said tubes has an outlet means communicating, respectively, with said inner space and outer space; and means for closing said outlet means, said outlet means being spaced different distances from the free ends of said tubes.

4. A device as set forth in claim 3 wherein one of said tubes projects from the end of the other of said tubes.

5. A device as set forth in claim 1 and including a casing means adapted to be attached to said container; a flywheel means mounted on said casing means and operatively connected to the outer tube for raising and lowering said tubes and said head member; means on said casing means operatively connected to said outer tube to guide the same for longitudinal movement while blocking turning movement; and sealing means for sealing said outer tube and said casing means.

6. A device as set forth in claim 1 wherein said head member includes an auxiliary device comprising a casing formed with two chambers and with two ducts connecting said chambers, and diaphragm means traversing said chambers and forming a first and a second compartment in each chamber, one of said ducts connecting said first compartments and the other of said ducts connecting said second compartments, an inlet valve in one of said compartments and an outlet valve in the other of said first compartments, said valves being connected to the diaphragm means; spring means located in the respective second compartment and acting on said outlet valve; a first pipe means connected to said head member and communicating with said third chamber and with one of said ducts; a second pipe means connected to the other of said ducts and adapted to be connected to the container; said inlet valve means being adapted to be connected to a source of compressed air having a higher pressure then the pressure in the container whose level is to be checked.

7. A device as set forth in claim 1 wherein at least one of said tubes includes labyrinth means located therein; and a flaring extension member secured to the free end of said tube.

8. A device as set forth in claim 1 and including an auxiliary device, said device including a body member having a cavity, a diaphragm secured to said body member and extending through said cavity, said diaphragm defining two chambers in said cavity, an extension tube secured to said body member and communicating with one of said chambers, said body member having a duct connecting the other of said chambers with the outside, a piston member located in said other chamber resting on said diaphragm, and having a valve portion projecting out of said body member, a wide tube member surrounding at least one of said tubes of the device and being secured to the same, and a member between said tube and said wider tube member formed with passages and with a valve seat communicating with said passages, said valve portion of said piston cooperating with said valve seat.

9. A device as set forth in claim 1 and including an auxiliary apparatus, said apparatus comprising a tubular member; two rings for securing said tubular member to one of said tubes surrounding the same, said rings being longitudinally spaced, one of said rings having a plurality of openings; a floating valve member located in the space between said rings, said tube, and said tubular member, the other of said rings having a duct terminating in a valve seat cooperating with said floating valve member; two concentric tubular means secured to the outer surface of said other ring between said tube and said tubular member and having openings adjacent said other ring remote from said one ring, said tubular means, projecting beyond the ends of said tube and tubular member.

10. A device as set forth in claim 9 and including a cap member having a small opening and being secured to the inner tubular means opposite the end of said tube.

References Cited in the file of this patent

UNITED STATES PATENTS

| | | |
|---|---|---|
| 2,041,014 | Norton | May 19, 1936 |
| 2,102,304 | Charbonneau | Dec. 14, 1937 |
| 2,358,732 | Otto | Sept. 19, 1944 |
| 2,481,612 | Nicholson | Sept. 13, 1949 |
| 2,520,660 | Sedgwick | Aug. 29, 1950 |
| 2,537,474 | Mejean | Jan. 9, 1951 |
| 2,635,546 | Enyeart et al. | Apr. 23, 1953 |
| 2,756,301 | Sutton | July 24, 1956 |
| 2,768,646 | Plank | Oct. 30, 1956 |
| 2,834,845 | Nielsen | May 13, 1958 |
| 2,910,003 | Kaatz | Oct. 27, 1959 |